J. P. NIKONOW.
STARTING AND GEAR SHIFTING MECHANISM.
APPLICATION FILED DEC. 18, 1914.
1,206,355.
Patented Nov. 28, 1916.
3 SHEETS—SHEET 2.
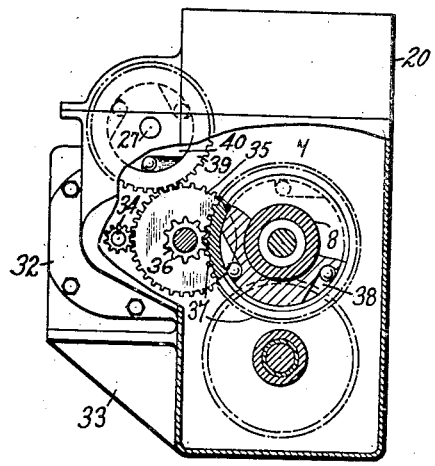
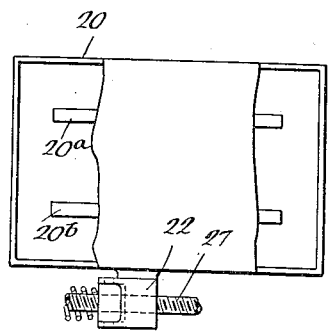
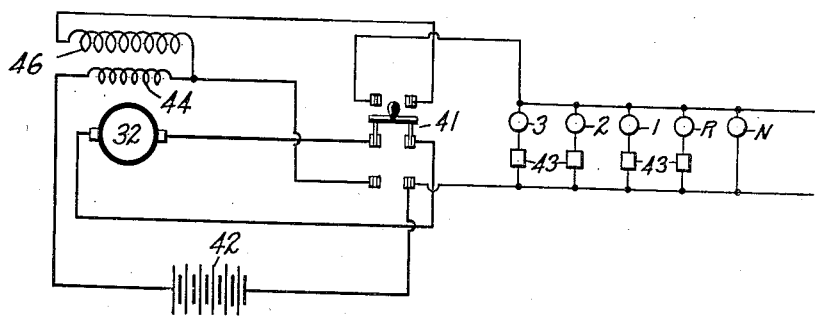
WITNESSES:
INVENTOR
John P. Nikonow
BY
ATTORNEY J. P. NIKONOW.
STARTING AND GEAR SHIFTING MECHANISM.
APPLICATION FILED DEC. 18, 1914.

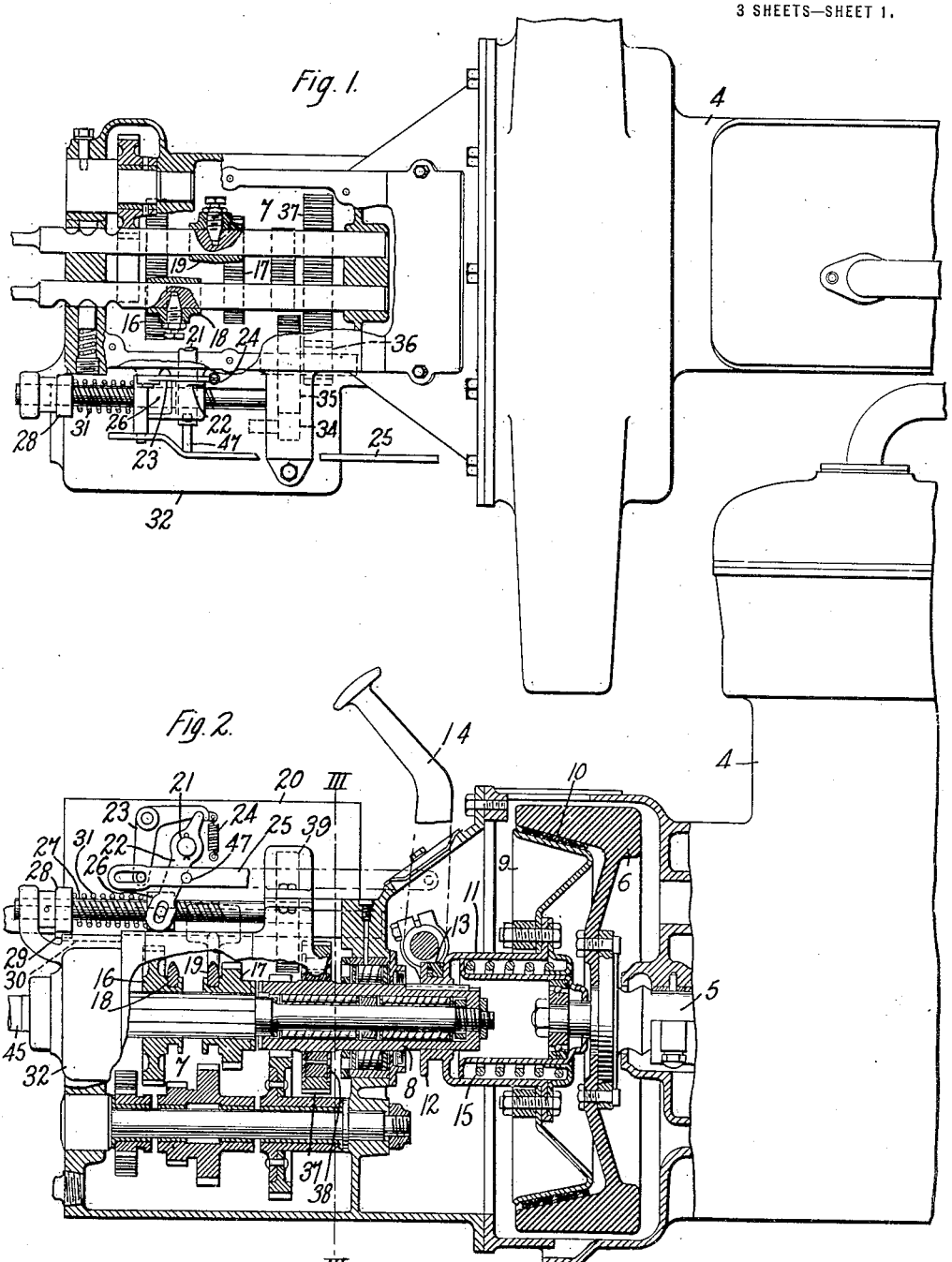

1,206,355.

Patented Nov. 28, 1916.
3 SHEETS—SHEET 3.

WITNESSES:

INVENTOR
John P. Nikonow.
BY
ATTORNEY

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING AND GEAR-SHIFTING MECHANISM.

1,206,355.

Specification of Letters Patent. Patented Nov. 28, 1916.

Application filed December 18, 1914. Serial No. 877,898.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Starting and Gear-Shifting Mechanisms, of which the following is a specification.

My invention relates to starting and gear shifting mechanisms and particularly to means for effecting the changes in speed ratio of the transmission mechanisms of automobiles or other motor vehicles.

My invention has for its object to provide a simple arrangement whereby the usual starting motor of a motor vehicle may be employed to supply the power necessary to actuate the gear shifting mechanism for controlling the transmission mechanism.

In the operation of manually operable gear shifting mechanisms, considerable power is required to effect the various changes in speed ratio. It has been proposed to provide a separate power device for actuating such mechanisms, but such devices are not only expensive but add materially to the weight of the vehicle. A further disadvantage of such devices is that their operation is accompanied by a considerable shock because of the inertia of the moving parts.

According to my present invention, I provide a simple means whereby the usual starting motor may be employed to supply the power necessary for actuating the gear shifting mechanism. A spring which actuates the gear shifting mechanism is first compressed by the starting motor. The spring is released by the actuation of the usual clutch pedal to disengage the engine clutch. This arrangement provides that the movable gear wheels of the transmission mechanism are shifted only when the transmission clutch is disengaged.

Figure 6:
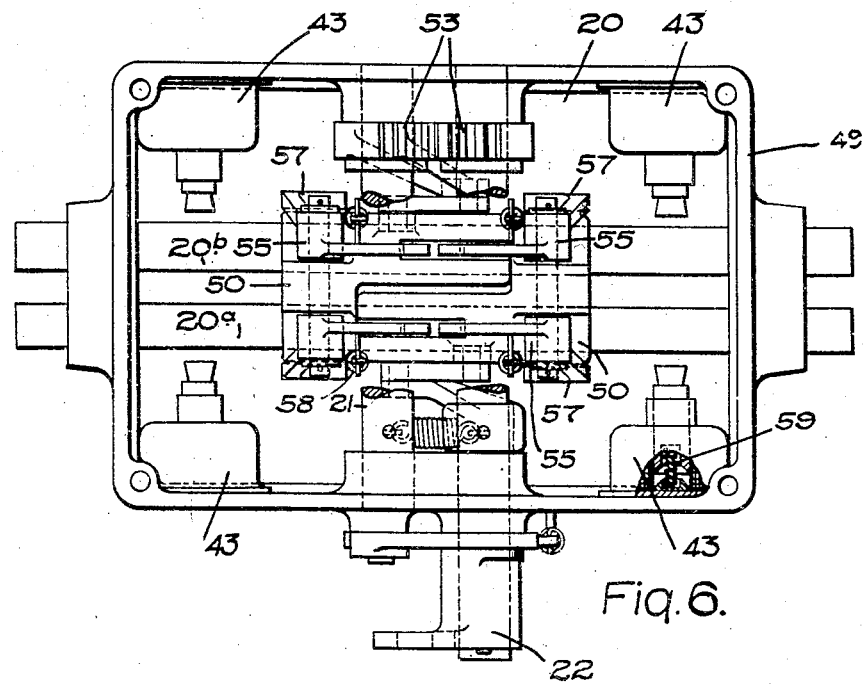
Figure 7:
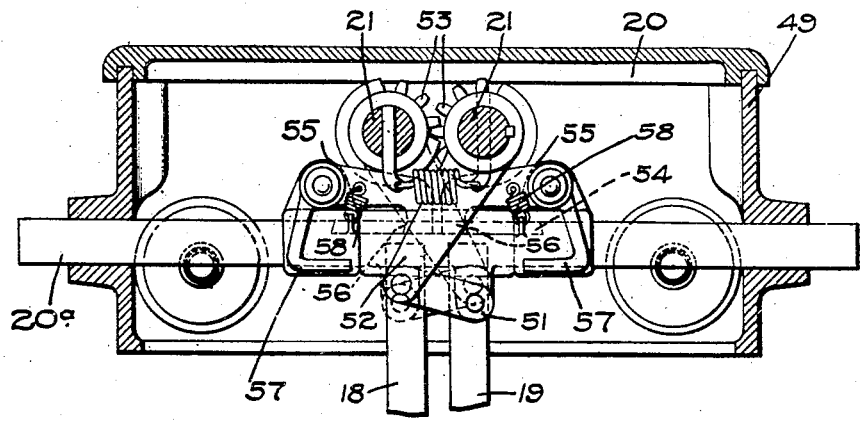

In the accompanying drawings, Figure 1 is a view, partially in plan and partially in section, of the transmission mechanism of an automobile and its related parts, with my invention applied thereto. Fig. 2 is a side view, partially in elevation and partially in section, of the mechanism of Fig. 1. Fig. 3 is an end view, partially in elevation and partially in section, of the mechanism of Fig. 1. Fig. 4 is a diagrammatic view of the circuits and apparatus embodying my invention. Fig. 5 is a plan view of the gear-shifting mechanism, parts being broken away. Fig. 6 is a plan view of the gear-shifting mechanism. Fig. 7 is a view, partially in elevation and partially in section, of the mechanism of Fig. 6.

Referring particularly to Figs. 1, 2 and 3, an automobile engine 4, only a portion of which is shown, has a shaft 5 upon which is mounted the usual fly wheel 6. The transmission mechanism 7 or change speed gear mechanism of the vehicle is connected to the engine shaft 5 by a rotatably mounted sleeve member 8 and a conical clutch member 9 which coacts with a correspondingly shaped clutch member 10 formed in the fly wheel 6.

The clutch member 9 is connected to the sleeve member 8 by a sleeve member 11 that is slidably mounted on the sleeve member 8 and is rotatable therewith. The sleeve member 11 is provided with an integral grooved collar 12 to be engaged by a yoke member 13 that is connected to the usual clutch pedal lever 14. A spring 15 normally retains the clutch member 9 in engagement with the clutch member 10 in the fly wheel 6, with the clutch pedal lever 14 in its rearward position.

The details of the transmission mechanism 7 form no part of the present invention. It may be noted, however, that it comprises two movable gear wheels 16 and 17 that are shifted into such relations with coacting gear wheels as to produce the desired speed ratios. The gear wheels 16 and 17 are connected by any suitable means comprising yoke members 18 and 19 to a gear shifting mechanism indicated at 20.

The details of the gear shifting-mechanism 20 form no part of the present invention. The mechanism is illustrated diagrammatically in Fig. 5. Two shift rods 20ᵃ and 20ᵇ, which are connected by any suitable means to the movable gear wheels 16 and 17, are actuated by the shaft 21. It will be understood, however, that any of the existing or commercial forms of electromagnetically controlled gear-shifting mechanisms having a single actuating member may be substituted for the mechanism illustrated. The gear shifting mechanism comprises a shaft 21 to which power may be applied for the actuation of the mechanism. A lever arm 22, which is fixed on the shaft 21, is normally held in the inoperative position of the gear shifting mechanism by a notched lever 23 and a spring 24. The lever 23 has a lost motion connection with a link 25 which is connected to the pedal lever 14.

The lever 22 is connected to a sleeve 26 which is slidably mounted on a shaft 27 that is provided with screw threads of a relatively steep pitch. A traveling nut 28, which coacts with the threaded portion of the shaft, is prevented from rotating therewith by a projecting portion 29 which slides in a groove 30, indicated by dotted lines in Fig. 2. A spring 31 surrounds the shaft 27 and is compressed between the nut 28 and the sleeve 26 when the former is actuated longitudinally of the shaft.

An electric motor 32 is supported by a bracket 33 that is integral with the casing of the transmission mechanism. The motor is provided with a pinion 34 which is connected to the sleeve member 8 of the transmission mechanism by means of a gear wheel 35, pinion 36, gear wheel 37 and a one-way clutch 38 of the usual roller type. The pinion 34 is connected to the shaft 27 by means of the gear wheel 35, gear wheel 39 and a one-way clutch 40 that is similar to the clutch 38.

The clutches 38 and 40 are so arranged that one of them is operative only when the motor operates in one direction and the other is operative only when the motor rotates in the reverse direction. The direction of rotation of the motor is controlled by any suitable switch mechanism, as for example, a double-throw switch 41, illustrated in Fig. 4.

Reference may now be had to Fig. 4 which is a diagrammatic view of the circuits and apparatus employed in connection with my invention. The motor 32 is supplied with current from a battery 42. The double-throw switch 41 operates, according to its position, to interchange the connection of the motor terminals to the terminals of the battery.

The gear shifting mechanism may be of any well known selective type, such, for example, as that shown and described in a co-pending application, Serial No. 840,655, filed May 25, 1914, by John E. Webster, and assigned to the Westinghouse Electric & Manufacturing Company, and it may be assumed that it is controlled by electro-magnets 43 and push buttons designated according to the corresponding speed ratio as N (neutral), R (reverse) and 1, 2 and 3 for first, second and third speeds, respectively. The motor circuit may be closed by means of any of the several push buttons for controlling the gear shifting mechanism when the switch 41 is in the gear shifting position. When the switch 41 is in the starting position, the push buttons are rendered inoperative to control the motor circuit.

Reference may now be had to Figs. 6 and 7 in which the details of the gear-shifting mechanism 20 are illustrated. The shift rods 20$^a$ and 20$^b$ are slidably mounted in a housing or casing 49. The yoke members 18 and 19 respectively connect the shiftable gear wheels 16 and 17 of the transmission mechanism to the shift rods 20$^a$ and 20$^b$. Two block members 50, which are slidably mounted upon the shift rods 20$^a$ and 20$^b$, are connected by links 51 to lever arms 52 that are carried by a pair of rock shafts 21. The rock shafts 21, one of which carries the lever 22, are operatively connected by gear segments 53.

Each of the shift rods is provided with a longitudinal groove 54. Four dogs 55, that are pivotally mounted on opposite sides of the blocks 50, are each provided with a hook portion 56 for engaging the respective shift rods. Each of the dogs 55 is provided, also, with a horizontally extending portion 57. Springs 58 normally retain the dogs 48 in the positions shown in Fig. 7, with the hook portions 56 resting upon the bottoms of the grooves 54.

The electromagnets 43 are respectively mounted upon the exterior of the side walls of the casing 49 and adjacent to the corners of it. Each electromagnet comprises a movable core member that projects into the casing 49 and is normally held in its extended position in the path of movement of the corresponding dog 55 by a spring 59. When the windings of the several electromagnets are energized, the core members are withdrawn from the path of movement of the dogs 55.

In the operation of the gear-shifting mechanism, a single electromagnet is energized to select the desired speed ratio. The core member is withdrawn from the path of movement of the corresponding dog 55 while the other core members remain in their illustrated positions. It will be readily understood that, upon the actuation of the rock shafts 21 and the blocks 50 that are connected thereto, the dogs 55 move outwardly in opposite directions.

All of the dogs 55, except the one coacting with the core member of the magnet that is energized, are rotated about their points of pivotal support in order that the hook portions do not engage the corresponding shoulders at the end of the grooves in the shift rods. The other dog 55 engages the shift rod with which it coacts and effects the shifting of the connected gear wheel to the desired position.

It may be assumed that the various parts are in their respective illustrated positions except that the switch 41 is in its open or mid position. To start the engine, it is only necessary to actuate the switch 41 to its lower position to close the motor circuit. Current then flows from the positive side of the battery, through a series field winding 44 of low resistance, the switch 41, armature winding 32 and switch 41 to the negative side of the battery. The motor then rotates in a clockwise direction, as illustrated in Fig. 3, to rotate the engine shaft through a mechanism comprising the pinion 34, gear wheel 35, pinion 36, gear wheel 37, clutch 38, sleeve members 8 and 11, clutch members 9 and 10, and fly wheel 6.

When the engine starts under its own power, the switch 41 is actuated to its upper or running position to open the motor circuit and to render the push buttons operative to control the gear shifting mechanism. During the starting of the engine, the gear wheel 39 is rotated in a clockwise direction, but the clutch 40 is inoperative to rotate the shaft 27. It may be noted that, in order to start the engine, it is necessary that the clutch pedal lever 14 be in its rearward position in order that the clutch members 9 and 10 may be in engagement.

When it is desired to connect the engine shaft to the transmission shaft 45 of the vehicle, one of the push buttons for controlling the gear shifting mechanism is actuated. It may be assumed, for example, that it is desired to start on first speed and the corresponding push button 1 is accordingly actuated. A circuit is completed which extends from the positive side of the battery 42 through the series field winding 44, a series field winding 46 of relatively high resistance, switch 41, armature winding 32, switch 41, push button 1 and its corresponding electromagnet 43, to the negative side of the battery. The motor 32 then rotates in a counter clockwise direction to rotate the shaft 27 through a mechanism comprising the pinion 34, gear wheel 35, gear wheel 39 and clutch 40. The rotation of the shaft 27 causes longitudinal movement of the nut 28 to the right, as shown, to compress the spring 31. Movement of the sleeve member 26 is prevented by a pin 47 on the link 16. When the spring 31 is fully compressed, the motor 32 is brought to a stop and acts as a torque motor to retain the spring under compression until it is released. The operator then actuates the pedal lever 13 forwardly to disengage the clutch members 9 and 10 and to actuate the bell crank lever 23 to release the lever 22. The spring 31 then actuates the sleeve 26 to the right, as shown, to actuate the gear shifting mechanism to effect the desired connection of the gear wheels of the transmission mechanism 7. The operator then releases the push button 1 and the pedal lever 14 to effect the engagement of the clutch members 9 and 10 to operatively connect the engine to the transmission shaft 45. The opening of the motor circuit frees the shaft 27 from the torque applied to it and the clutch spring 15, which has been compressed, operates through the lever 14, link 25 and a pin 47 to return the slidable sleeve 26, the spring 31 and the traveling nut 28 to their respective inoperative positions. The pitch of the threads on the shaft 27 permits the nut 28 to rotate it backwardly during the return movement of the latter. During the gear shifting operation, the gear wheel 37 is rotated in a counter clockwise direction, as shown, but the clutch 38 is inoperative to connect the gear wheel 37 to the sleeve 8.

When it is desired to change the speed ratio, the push button corresponding to the desired speed is actuated, and the gear shifting mechanism operates in the manner above described in connection with the first speed connection to arrange the movable gear wheels 16 and 17 to produce the desired speed ratio.

To shift the movable gear wheels to their neutral positions, when one of them has been shifted, it is only necessary to successively actuate the push button N and the pedal lever 14 as described above in connection with the shifting of one of the movable gears to their respective operative positions.

It will be noted that I provide an arrangement whereby the usual starting motor may be rotated in reverse directions to actuate the engine shaft and the gear shifting mechanism, respectively. The engine may be started only when the engine clutch is in engagement and the gear shifting mechanism may be actuated only when the engine clutch is disengaged. The storage of energy in a spring, which actuates the gear shifting mechanism, avoids all shock incident to the inertia of the various moving parts.

I claim as my invention:

1. The combination with a gear shifting mechanism, an energy storage device for actuating said mechanism, and a power device, of means for controlling said mechanism and for simultaneously causing said power device to supply energy to said storage device.

2. The combination with a gear shifting mechanism, a spring for actuating said mechanism, and a motor, of means for simultaneously controlling said mechanism and causing said motor to store energy in said spring.

3. The combination with a gear shifting mechanism, a spring for actuating said mechanism, and a motor, of common means for controlling said mechanism and said motor to cause said motor to store energy in said spring.

4. The combination with an engine shaft, a gear shifting mechanism, a spring for actuating said mechanism, and a motor, of means for operatively connecting said motor either to said engine shaft or to said spring.

5. The combination with an engine shaft, a gear shifting mechanism, a spring for actuating said mechanism, and a motor, of means for operatively connecting said motor to said engine shaft or to said spring, according to the direction of rotation of said motor.

6. The combination with an engine shaft, a gear shifting mechanism, a spring for actuating said mechanism, and a motor, of means for operatively connecting said motor to said engine shaft or to said spring, according to the direction of rotation of said motor, and means for controlling the direction of said motor.

7. The combination with an engine shaft, a gear shifting mechanism, a spring for actuating said mechanism, and a motor, of means comprising one-way mechanisms for operatively connecting said motor either to said shaft or to said spring, according to the direction of rotation of said motor.

8. The combination with a gear shifting mechanism, a spring for actuating said mechanism and means comprising coacting screw-threaded members and a motor for storing energy in said spring, of a clutch, and means comprising a lever for controlling said clutch and the actuation of said mechanism.

9. The combination with a gear shifting mechanism, an actuating spring therefor, and means comprising a rotatable shaft, a screw-threaded member on said shaft and a motor for actuating said shaft for storing energy in said spring, of a clutch, a controlling lever therefor, and means controlled by said lever for releasing said spring to actuate said mechanism.

10. The combination with a gear shifting mechanism, an actuating spring therefor, means comprising a rotatable shaft, a screw-threaded member on said shaft and a motor for storing energy in said spring, and means for releasing said spring, of a clutch, and a lever for controlling said clutch and for actuating said releasing means when said clutch is disengaged.

11. The combination with an engine shaft, a gear shifting mechanism, and a spring for actuating said mechanism, of means comprising an electric motor having a low resistance circuit for actuating said engine shaft and a high resistance circuit for storing energy in said spring.

12. The combination with a gear-shifting mechanism, an energy-storage device for actuating said mechanism, and a power device, of means for controlling said mechanism and for simultaneously causing said power device to supply energy to said storage device, said means comprising a push button and a plurality of electrical circuits.

In testimony whereof, I have hereunto subscribed my name this 10th day of Dec., 1914.

JOHN P. NIKONOW.

Witnesses:
B. B. HINES,
M. C. MERZ.